(12) United States Patent
Yaqub et al.

(10) Patent No.: US 7,505,433 B2
(45) Date of Patent: Mar. 17, 2009

(54) AUTONOMOUS AND HETEROGENEOUS NETWORK DISCOVERY AND REUSE

(75) Inventors: Raziq Yaqub, Stewartsville, NJ (US); Tao Zhang, Fort Lee, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 252 days.

(21) Appl. No.: 11/096,722

(22) Filed: Apr. 1, 2005

(65) Prior Publication Data

US 2006/0221901 A1    Oct. 5, 2006

(51) Int. Cl.
*H04Q 7/00* (2006.01)

(52) U.S. Cl. ............... 370/331; 370/230; 370/235; 370/254; 370/332; 370/400; 455/436; 455/432.1

(58) Field of Classification Search .......... 370/331, 370/230, 235, 254, 332, 333, 335, 338, 342, 370/401, 400; 455/436, 432.1, 437, 438, 455/439, 440, 442, 443, 444
See application file for complete search history.

(56) References Cited

U.S. PATENT DOCUMENTS

| | | | |
|---|---|---|---|
| 7,161,914 B2 * | 1/2007 | Shoaib et al. ............ | 370/331 |
| 2002/0059453 A1 * | 5/2002 | Eriksson et al. .......... | 709/238 |
| 2003/0087646 A1 * | 5/2003 | Funato et al. ............ | 455/456 |
| 2004/0137901 A1 | 7/2004 | Hamasaki et al. | |
| 2004/0249915 A1 * | 12/2004 | Russell .................. | 709/223 |
| 2005/0073521 A1 * | 4/2005 | Watanabe et al. ......... | 345/440 |
| 2005/0286466 A1 * | 12/2005 | Tagg et al. ............. | 370/329 |
| 2006/0025151 A1 * | 2/2006 | Karaoguz et al. ......... | 455/455 |
| 2006/0088011 A1 * | 4/2006 | Iyer et al. .............. | 370/338 |
| 2006/0095954 A1 * | 5/2006 | Buckley et al. ........... | 726/2 |

FOREIGN PATENT DOCUMENTS

EP    1 307 003 A2    5/2003
EP    1 507 362 A1    2/2005

OTHER PUBLICATIONS

A. Mishra et al.; "Context Caching using Neighbor Graphs for Fast Handoffs in a Wireless Network," Infocom 2004; vol. 1 Mar. 7, 2004; pp. 351-361.
International Search Report dated Jul. 13, 2006.

* cited by examiner

*Primary Examiner*—Matthew D Anderson
*Assistant Examiner*—Shaima Q Aminzay
(74) *Attorney, Agent, or Firm*—Watchstone P+D, pllc; Stephen B. Parker

(57) ABSTRACT

In some embodiments, a method is disclosed involving a mobile device discovery and use of target wireless networks which are at least partly within a coverage area of another wireless network which provides location information which includes: acquiring data from a plurality of said target wireless networks; acquiring location information from said another wireless network; mapping said data from said plurality of said target wireless networks with said location information; and selecting one of said plurality of target wireless networks based on said mapped data.

18 Claims, 5 Drawing Sheets

AUTONOMOUS AND HETEROGENEOUS NETWORK DISCOVERY AND REUSE

BACKGROUND

1. Field of the Invention

The present application relates to wireless networking and, in some preferred embodiments, to systems and methods for mobile stations autonomous and heterogeneous network discovery and reuse, and, in some preferred embodiments to the discovery of networks and information regarding the networks, and, in some preferred embodiments, to methods of using information acquired by autonomous discovery to support proactive handover actions and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Network Discovery

In the evolution of wireless networking based on, e.g., wireless LAN (Local Area Network) and cellular technologies, and as mobility services prevail and people become increasingly mobile, it is more important for a mobile device to be able to find an appropriate point of network attachment that meets the application requirements and the characteristics of the mobile, in a timely, accurate and efficient manner. In this disclosure, this functionality is referred to as network discovery.

In this regard, network discovery can relate to, e.g., the discovery of information that the mobile station uses to access a network, such as, by way of example, a network attachment point identification (e.g., an L2 address and/or a geographical address of an access point), a MAC type (e.g., "IEEE 802.11g") of an access point, a security type (e.g., "WPA" or "PANA and Ipsec") supported by an access point, a layer-3 type (e.g., "IPv4 only" or "IPv4/v6 dual stack"), a provider name, or the addresses of a server or an agent (e.g., PANA authentication agents, access routers, SIP servers and Mobile IP home agents).

While a variety of wireless systems and methods are known, there remains a need for improved systems and methods, related to, among other things, network discovery and reuse.

SUMMARY OF THE PREFERRED EMBODIMENTS

The preferred embodiments of the present invention can significantly improve upon existing methods and/or apparatuses.

The preferred embodiments relate to new methods for a mobile station (MS) to autonomously discover the existence of networks and information regarding the networks. For example, the MS functions without assistance from other MSs or from network information servers. The information acquired by autonomous discovery is used to support proactive handover actions.

In one embodiment of the invention, a mobile station autonomously discovers the existence of networks and data regarding the networks in a cellular network. Upon entering into a cellular cell area, data is acquired from at least one a target network, and most typically, from a plurality of target networks. A list of acquired target networks is generated and is retained upon exiting said cellular cell area. In this disclosure, the terminology "list" encompasses not only the illustrated and described exemplary tables herein, but any manner of maintaining data, which can include, e.g., any form of digital or computer storage or memory, any format of storage, such as, e.g., within tables, spreadsheets, relational databases and/or any other arrangement of data storage. When the mobile station re-enters a cellular cell area, the acquired data from the list is used to determine which networks are within the cell area. Where a cellular cell area has a plurality of WLANs the list is populated with data from the plurality of WLANs. Using the data in the list, the most suitable WLAN can be selected from the list of a plurality of WLANs, based on predetermined criteria.

The data acquired by autonomous discovery is preferably used to support proactive handover actions. The method of supporting proactive handover can include the steps of selecting the most suitable WLAN from said list of a plurality of WLANs, based on predetermined criteria. The method can include the step of performing pre-authentication with the target network. In another embodiment of the invention the method can include the step of obtaining a local IP address from a target network upon entering into said cell area.

In another embodiment of the invention, in which there are pluralities of WLANs within a cell area, the list of known networks can be mapped with location data received from the cellular network.

In another embodiment of the invention, upon entering into a subsequent cellular cell area, data is acquired from at least one a target network within the subsequent cell area. A list of acquired target networks within the subsequent cell area is maintained and retained said list upon exiting the subsequent cellular cell area, such that the list comprises data from a plurality of different cell areas.

In another embodiment of the invention, the mobile station performs proactive handover actions of a selected candidate network. The pro-active handover can include the steps of anticipating the need for a handover, selecting the most suitable network from the list of acquired target networks, based on predetermined criteria using of available data from said list, and thereafter handing over to a selected candidate network when the need arises to handover from one network to another network.

In another embodiment of the invention, WLAN broadcasts are monitored and parameters mapped with LAI and CGI are stored in the list. The stored data in the list can include signal strength and time of acquisition.

In another embodiment of the invention, the method can include the steps of:

1) recording a recent history of movements of a mobile station;
2) recording the WLANs traversed in the movement pattern from a first cell area to subsequent cell areas;
3) storing data about recorded WLANs specifically mapped with LAI and CGI;
4) down selecting the most suitable candidate network (e.g., based on CGI during a current session);
5) acquiring a local IP address from the down selected most suitable candidate network;
6) performing pre-authentication with the selected network;
7) making the selected network available for a prospective handover; and
8) recording a log of performance of networks used.

In some examples, the embodiment can further comprise the steps of a user of said mobile station selecting priority parameters for the selection of a candidate network from the available candidate networks, and storing in said mobile station, the user's selected priority parameters.

In another embodiment of the invention, data in said list is sorted based on the user's preferred selection criteria and priority selection weights are assigned to the sorted data such that preferred selection criteria data has greater selection weights than non-preferred selected criteria data. The embodiment can include the step of selecting an SSID based on the user's selected priority parameters.

In another embodiment of the invention, a method of a mobile station autonomously discovering the existence of networks and data regarding the networks in a cellular network, can comprise the steps of: upon entering into a cellular cell area, acquiring data from a plurality of target networks; storing a list of acquired target networks, and selecting a target network from a plurality of target networks within said cell area; and selecting a target WLAN based on weights assigned to known WLANs in accordance with probability $P_j$ which is calculated as follows:

$$p_j = \frac{W_j}{\sum_{i=1}^{k} W_i}$$

where W=assigned weight value, $P_j$=probability, k=number of WLANS within said mobile station's current cell area, $W_i$=the weight assigned to WLAN i, and $W_j$=the weight assigned to WLAN j.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

Figure 1:
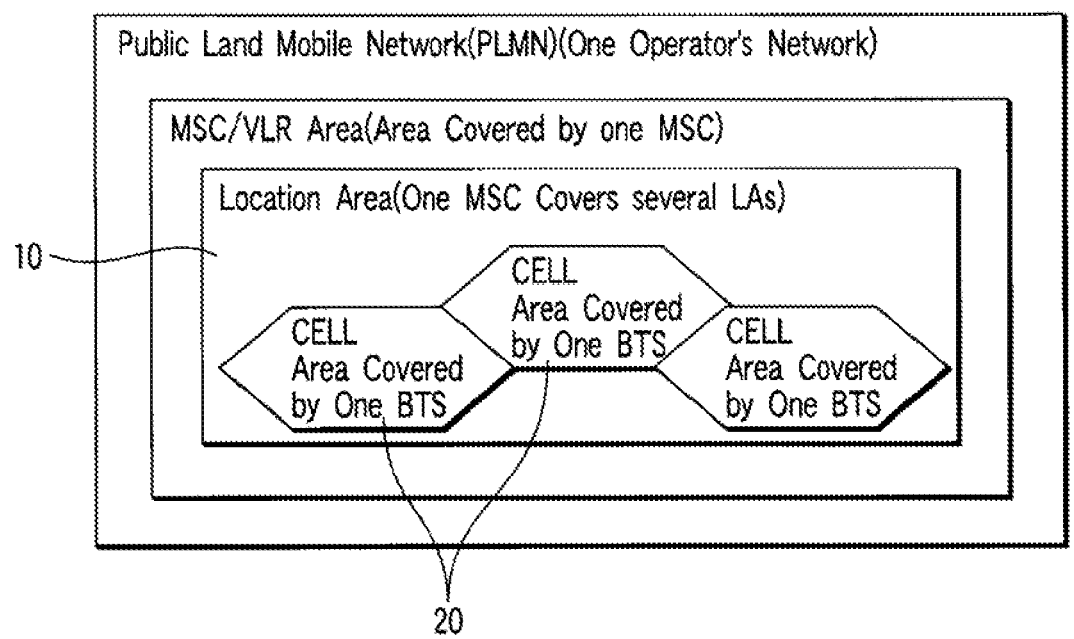
FIG. 1 is a schematic representation of multiple cells and each cell is identified by an identification Cell Global identity.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Seamless integration of heterogeneous wireless networks is a major step towards a new generation of wireless networks. In this regard, heterogeneous networks can include, e.g., different networks or networks having one or more dissimilarities. Achieving seamless integration of heterogeneous wireless networks requires capabilities to support seamless handover and mobility management to enable ubiquitous services across heterogeneous Radio Access Technologies (RATs). To support seamless handover across heterogeneous RATs, a system should preferably have the following notable capabilities:

1. Quick network discovery: To discover the existence of networks and information regarding the networks that a mobile station ("MS" or "mobile") will handover to;

2. Down selection of candidate networks: When multiple networks are available at the same time, a MS should preferably quickly select one network to use; and 3. Proactive handover: A MS may perform proactive handover actions before it actually hands over into a target network to reduce handover delay. For example, the MS may pre-acquire a local IP address from, and/or conduct pre-authentication with, a target network.

In an example of the invention, there is a MS with multiple radio network interfaces, such as a wireless Local Area Network (WLAN) interface and a cellular network interface (such as, e.g., GPRS, cdma2000, GSM), a geographical region that is covered by cellular services and WLANs are also available in the region. WLANs may not cover the entire region, but their coverage areas can overlap. When a MS moves about in this region, it may need to handover between WLANs, and between a WLAN and the cellular network.

When the mobile is covered by multiple WLANs simultaneously, it needs to select one WLAN to use if it decides to use a WLAN.

Preferably, the MS establishes and maintains a list of available networks, referred to as the "Known Networks". When a MS receives radio signals from a network or when the mobile connects to the network, the mobile learns about the existence of the network and other information about the network that the mobile can use to prioritize the networks. At the same time, the MS uses the information available to it from its cellular network interface to help determine the locations of its Known Networks. This enables the MS to know, for example, which WLANs are inside a cell of the cellular network. The mobile maintains the list of the Known Networks mapped with the location information received from the cellular network and retains it even after it leaves these networks. This enables the MS to use the information to determine where these networks are when the mobile comes back to the neighborhood in the future.

When the MS moves into a new cellular cell and there are multiple Known WLANs in the cell, the MS selects the most suitable candidate WLAN from the Known WLANs in the cell. This process is referred to as "down select". Then, the MS can perform pro-active handover actions for the selected candidate network. Pro-active handover refers to the use of available data in a pre-selection, in preparation for a handover. In a pro-active handover, there is preparation for the need for a handover and a pre-selection, as compared to processing handover determinations after the need arises. The pro-active handover actions include acquiring a local IP address from, or performing pre-authentication with, the target network. These proactive handover actions reduce handover delay and enable cellular subscribers to attain seamless service roaming across several RATs including, e.g., WLANs, 3G or other evolving RATs. Thus, a user can benefit from high throughput IP connectivity available in the footprint of a cellular network.

In an embodiment of the autonomous discovery mechanism, the autonomous discovery mechanism uses the Location Areas and their identifiers provided by, e.g., a cellular network or Public Land Mobile Network (PLMN). These include the Location Area Identity (LAI) and Cell Global Identity (CGI), which are internationally unique.

These location parameters are preferably broadcast on a Broadcast Control Channel (BCC or BCCH) in a cellular network and are used by the MS's cellular network interface for mobility management in the cellular network. The downlink channel contains specific parameters needed by a mobile in order that it can identify the network and gain access to it. Typical information includes the LAC (Location Area Code) and RAC (Routing Area Code), the MNC (Mobile Network Code) and BA (BCCH Allocation) list. The Subscriber Identity Module in the MS stores these parameters and updates them periodically as the MS traverses the cells of a cellular network. The Subscriber Identity Module is abbreviated as "SIM".

While a SIM card is generally used for GSM networks, a Universal Subscriber Identity Module (USIM) card can involve a multi-application chip card that supports multiple telecommunication applications, such as, e.g., both the internationally standardized W-CDMA format and the GSM format. So, while, e.g., a GSM format mobile phone may use an IC chip-embedded removable card called a SIM Card, which can, e.g., contains various information required for mobile communication, such as, e.g., the mobile phone's number, and allows the same phone number to be used seamlessly in any region that's covered by the GSM network, a USIM card can include an upgraded SIM card that is also compatible with the W-CDMA world standard. The computer chip inside the MS stores phone numbers, address book and other information. In this disclosure, the abbreviation "(U)SIM" is inclusive of USIM, ISIM and SIM.

The (U)SIM, which is specific to the cellular network, also stores user subscription data for identifying a user to network, and as previously noted, users' personal information, such the user's phone book, etc. Using the proposed autonomous discovery mechanism, the network discovery software in the MS retrieves LAI and CGI from the (U)SIM and makes use of them.

LAI includes Country Code (3 decimal digits), Mobile Network Code (2 decimal digits) and Location Area Code (maximum of 5 decimal digits). Thus, LAI=CC+MNC+LAC. The LAI stored on (U)SIM is periodically compared with that of the recent broadcast on BCCH and any change of Location Area initiates a location update request to the network.

A Location Area may be a large geographical area. As illustrated in FIG. 1, within, by way of example, a public land mobile network (PLMN), a Location Area 10 typically involves multiple cells 20. As also shown in FIG. 1, a plurality of Location Areas 10 are typically covered by one Mobile Switching Center (MSC) 30/(Visitor Location Register (VLR) area). Typically, each cell 20 is identified by an identification number called Cell Global identity (CGI). CGI is comprised of Location Area Code and Cell Identity. Thus, CGI=CC+MNC+LAC+Cell ID. CGI is also stored on (U)SIM, but updated when the mobile is in active mode.

It is anticipated that several independent WLANs can be, in some examples, operating in the geographical area covered by a single cellular cell. These WLANs broadcast their identifiers, for example, the Service Set IDs (SSIDs) that uniquely identify each Access Point in a WLAN. A MS that is capable of listening to these broadcast/parameters, can retrieve additional information such as Realm Part, Signal Strength, etc., from the SSIDs, in addition to information about the WLANs. In the preferred embodiments, an algorithm of the present invention listens to the WLAN broadcasts and stores the parameters, exclusively mapped with LAI and CGI along with signal strength and time stamp.

In some embodiments, the present invention can be configured to perform at least some of the following main functions:

1) Recording a recent history of movements of a MS;
2) Recording the WLANs traversed in the movement pattern;
3) Storing information about these WLANs specifically mapped with LAI and CGI, and down selecting the most suitable candidate network based on CGI while the session is going on;
4) Acquiring a local IP address from a selected target network;
5) Performing pre-authentication with the selected network and making the target network available for the possible handover;
6) Recording a log of performance of the networks used; and
7) Enabling the user to prioritize the available candidate networks based on the user's personal preferences for future use. In some embodiments, this will populate a table, such as, e.g., shown in FIG. 5. This stored/advance knowledge mapped with LAI/CGI can help in proactively deciding the next attachment point, reduce the network detection time, and consequently the vertical handover time. Because signal strength is also preferably stored with timestamp, it can also contribute to reduce physical layer (PHY) measurement timing, and help prioritize the best from the potential candidate networks.

An LA is often a large physical area (as, for example, several miles in diameter), and, for example, hundreds of WLANs may exist in that trajectory. On the other hand, a Cell is typically a much smaller area (such as, e.g., few hundred yards in dense urban areas, around 3 miles in less dense urban areas and around 10 miles in rural areas or highways passing through rural areas), and fewer WLANs will fall in the trajectory of a cell. The smaller cell area makes CGI attractive for keeping track of the WLAN locations. A MS receives periodic updates on LAI from the cellular network regardless of the mode it operates in, but only receives updates on CGI when it is in either Active mode (communicating) or Awake Mode (receiving short messages from the network). Therefore, to obtain updates on CGI anytime the MS wants the information, the MS can send a dummy SMS message to, for example, its own mobile device. Sending SMS messages updates the CGI in the (U)SIM of the MS. SMS refers to short message service, and includes sending small text messages to cell phones.

The access to a WLAN could, e.g., be free or based on service subscriptions with an Internet Service Provider (ISP) or a Cellular Service Provider (CSP). A CSP is also commonly referred to as a PLMN Operator. User authentication with an ISP usually requires username and password. User authentication with a PLMN Operator, on the other hand, may be done by, e.g., a (U)SIM on the MS or the like without a human user's intervention.

In an example embodiment, the MS has a subscription with a PLMN Operator so that it can use the cellular network, and, therefore, the MS is equipped with a (U)SIM card. When the PLMN Operator also provides WLANs, the user's PLMN subscription may also allow the user to access the WLANs offered by the PLMN Operator. In addition, the MS may also have service subscription with an ISP for using other WLANs.

Figure 2:
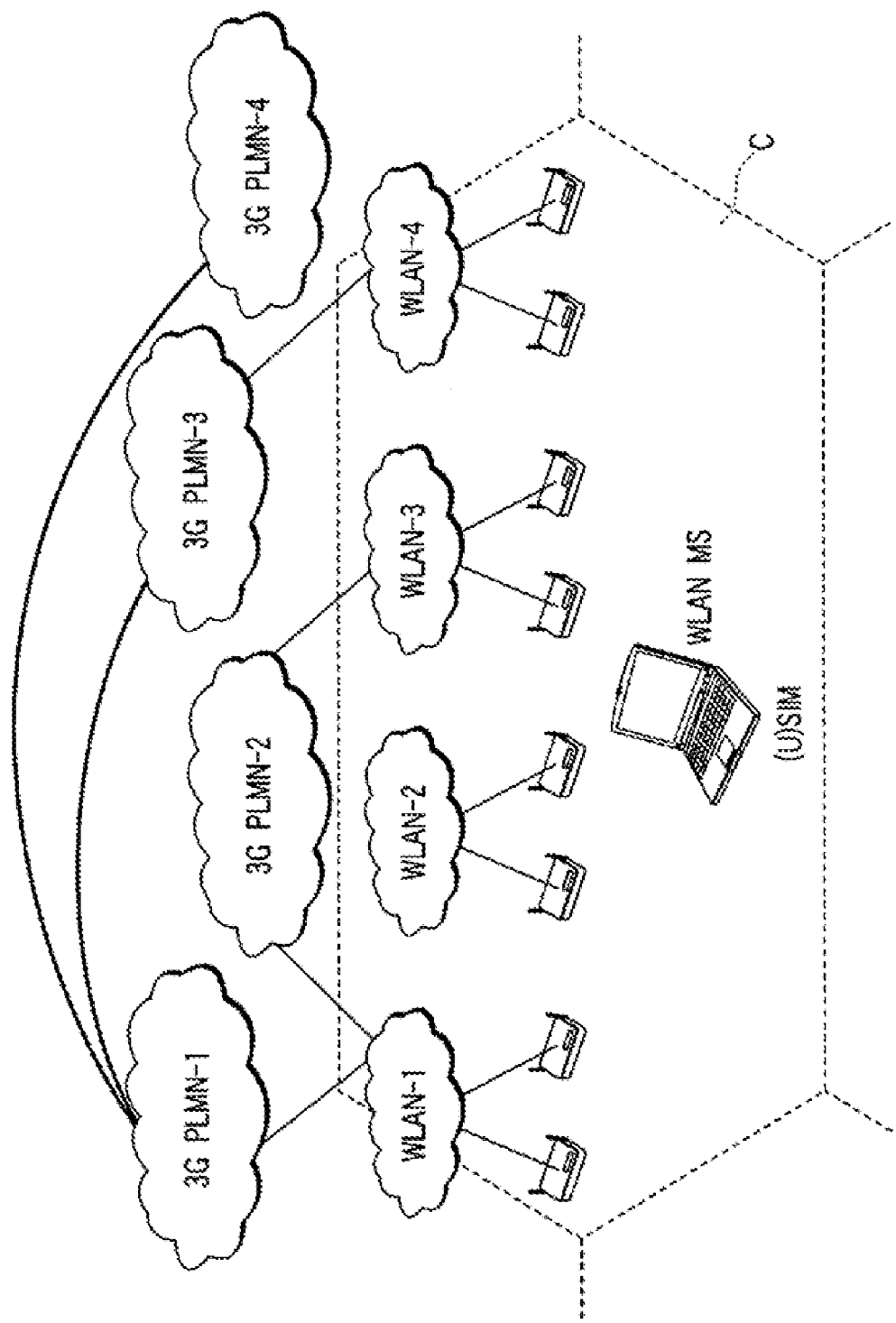
FIG. 2 is a schematic representation of the selection of a WLAN from a cell of a cellular system in which four WLANs (WLAN-1, WLAN-2, WLAN-3, and WLAN-4) are operating.

With reference to FIG. 2, the selection of a WLAN will be described. In some preferred embodiments, from the available WLANs, selection of a WLAN may be based on user's preferences. The User's preferences may vary from user to user or from time to time even for the same user. One such selection criterion is to prefer a WLAN that is capable of interworking with cellular and also have a roaming agreement with the user's home cellular network.

In the example of FIG. 2, a cell C of a cellular system is shown in which a mobile station WLAN MS is located-which may communicate with at least some of four WLANs (WLAN-1, WLAN-2, WLAN-3, and WLAN-4) that are operating within the cell C. In particular, FIG. 2 depicts a 3G-WLAN interworking model, including illustrative 3G PLMN networks, 3G PLMN-1, 3G PLMN-2, 3G PLMN-3 and 3G PLMN-4. From the administration point of view, these four WLANs may be owned by a variety of entities, such as, by way of example only:

1) Cellular (PLMN) operators;
2) ISP;
3) Hotspot Service Providers, but not necessarily ISPs (such as, e.g., an airport authority, a restaurant, such as, e.g., McDonalds™, Starbucks™, etc.); and/or
4) Corporations for use, e.g., primarily by employees and potentially by visitors.

With respect to Authentication, the WLANs illustrated in FIG. 2 may support, among other things, either:

1) Open Access Control: enabling a MS to have access to free services (e.g., uses 802.11 open authentication);
2) Universal Access Control: enabling a MS to have access to chargeable services (MS authenticated by PAC Gateway); or
3) 802.1X Access Control: enabling a MS to have access to chargeable services (MS authenticated via EAP method).

From an interworking point of view, some WLANs may be connected to PLMNs and some may not, such as, e.g., shown in the example illustrated in FIG. 2. A PLMN may be a Home PLMN (HPLMN) or Visited PLMN (VPLMN). HPLMN is the network in which the subscribers' profile is held, whereas a VPLMN is a network in which the mobile subscriber has roamed when leaving their HPLMN. Subscribers roaming to other networks will receive subscription information from the HPLMN.

Preferably, each WLAN broadcasts a Service Set Identifier (SSID) that serves as a WLAN identifier. The MS shown in FIG. 2 can receive signals from four WLANs. Assume PLMN-1 is the HPLMN of MS. If selection criteria mandates to pick the WLAN which is capable of interworking with cellular and also have a direct or indirect roaming agreement with his home cellular network, the first preference is to select WLAN-1 because it is capable of interworking and also has direct agreement with HPLMN (without involving any roaming partner or intermediary). In the absence of this choice, the second preference should be to select WLAN-4 because it is capable of interworking and also it has roaming agreement with HPLMN (even though indirect through PLMN-3). In this example, this is shown by the connection line between 3G PLMN-1 and 3G-PLMN-3 in FIG. 2. It should preferably not select WLAN-3 as it does not have direct or indirect roaming relation with HPLMN. In this example, this is shown by no connection line between 3G PLMN-1 and 3G-PLMN-2 in FIG. 2. Also, WLAN-2 should not be selected since it is neither capable of interworking, nor offer direct/indirect roaming with the HPLMN.

Figure 3:
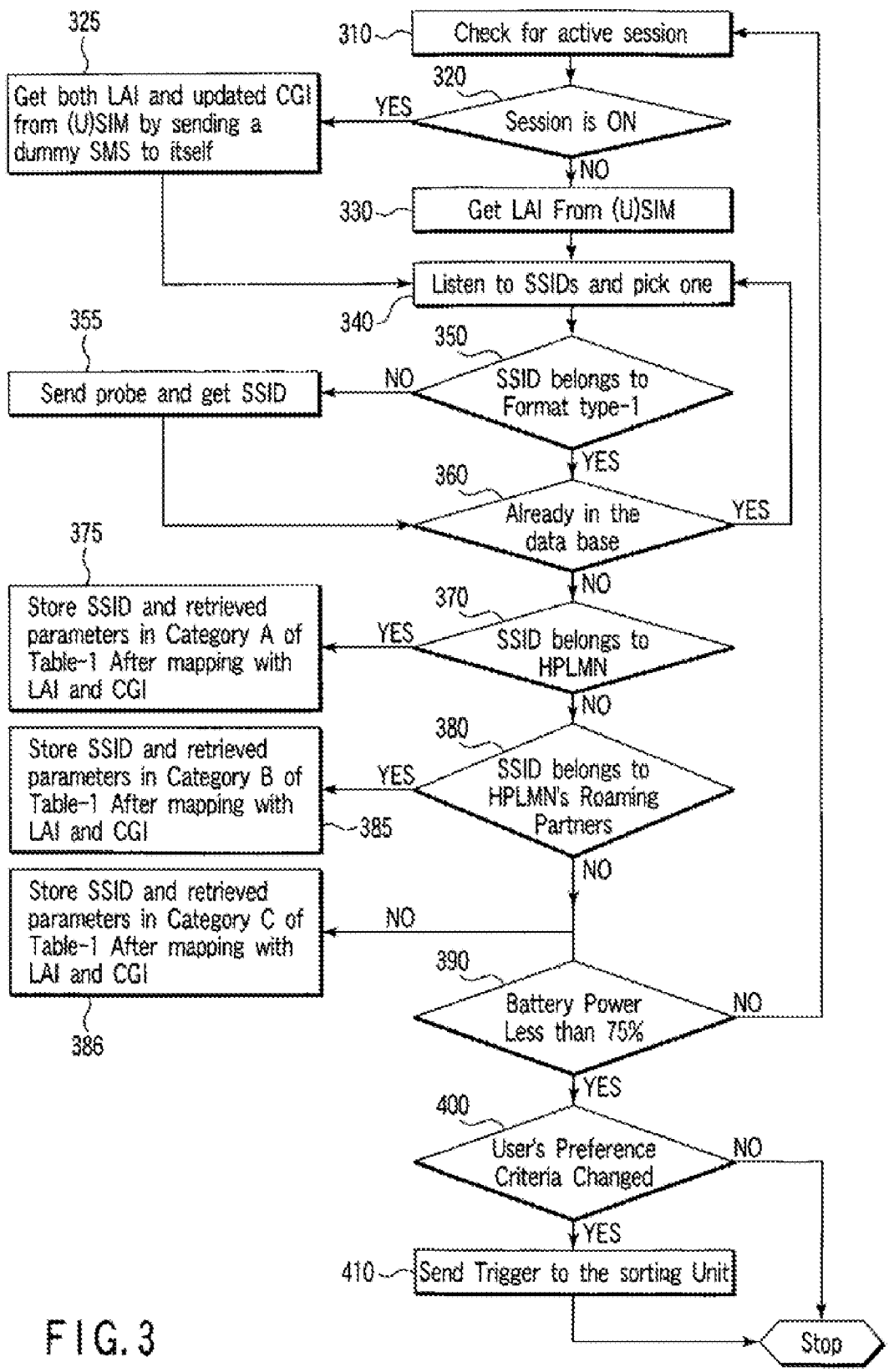
FIG. 3 is a flow diagram of the method of populating a table without connecting to a network.

This selection criterion is further described in Flow Diagram-A of FIG. 3. When no available WLAN meets the user's selected criterion, the sorting processor may either return a message that "No Network Meets the Specific Criterion" or may select a WLAN according to the next preference criterion (Security, Cost, Performance, etc.). These are discussed further below in this document.

Flow Diagram A of FIG. 3 shows that SSID can have two different types of formats in some embodiments: a) a legacy type; and b) an advanced type, such as, e.g. (WLAN_NAME: PLMN:MCC:MNC). See, for example, the following document "3GPP PLMN Selection for 802.11 Type of WLAN" 3GPP T-doc-S2-031430. The disclosure of which is incorporated here by reference in its entirety, as though recited in full. From the advanced SSID, the MS can easily find if:

1) The WLAN is the one with which the subscriber has a subscription (comparing WLAN_NAME);
2) The WLAN provides interworking with PLMN (detecting the word PLMN in the SSID);
3) The WLAN provides interworking with home PLMN (comparing mobile country code MCC and Mobile Network Operator's code MNC); or
4) The WLAN has direct or indirect roaming relationship with his home PLMN (comparing with SSIDs provisioned in MS client).

However, if the SSID format is of the legacy type, a MS may not be able to use the SSID to recognize the PLMN. In this case, an alternate method proposed in, F. Adrangi et al., "Mediating Network Discovery and Selection", Internet draft, draft-adrangi-exp-network-discovery-and-selection-01, Feb. 2004, can be used. The disclosure of Adrangi, et al., is incorporated herein by reference in its entirety, as though recited in full. According to this method, the MS sends a Decorated NAI in the Type-Data field of the "EAP-Identity Response" asking the WLAN if it supports his HPLMN or its preferred roaming partner, and in turn gets the answer in the "EAP-Identity Request" message. Upon receipt of the information, the MS then may select a preferred WLAN or store the information received for future use.

In another embodiment, the MS sends a simple query probe and in response receives XML metadata including information about the PLMNs interworking with this WLAN. This embodiment of the invention requires continually probing for each SSID. This might be burdensome from the power consumption point of view, in addition to adding extra delays.

However, in this embodiment, the MS preferably probes networks only until the predetermined minimum battery condition is reached.

Figure 5:
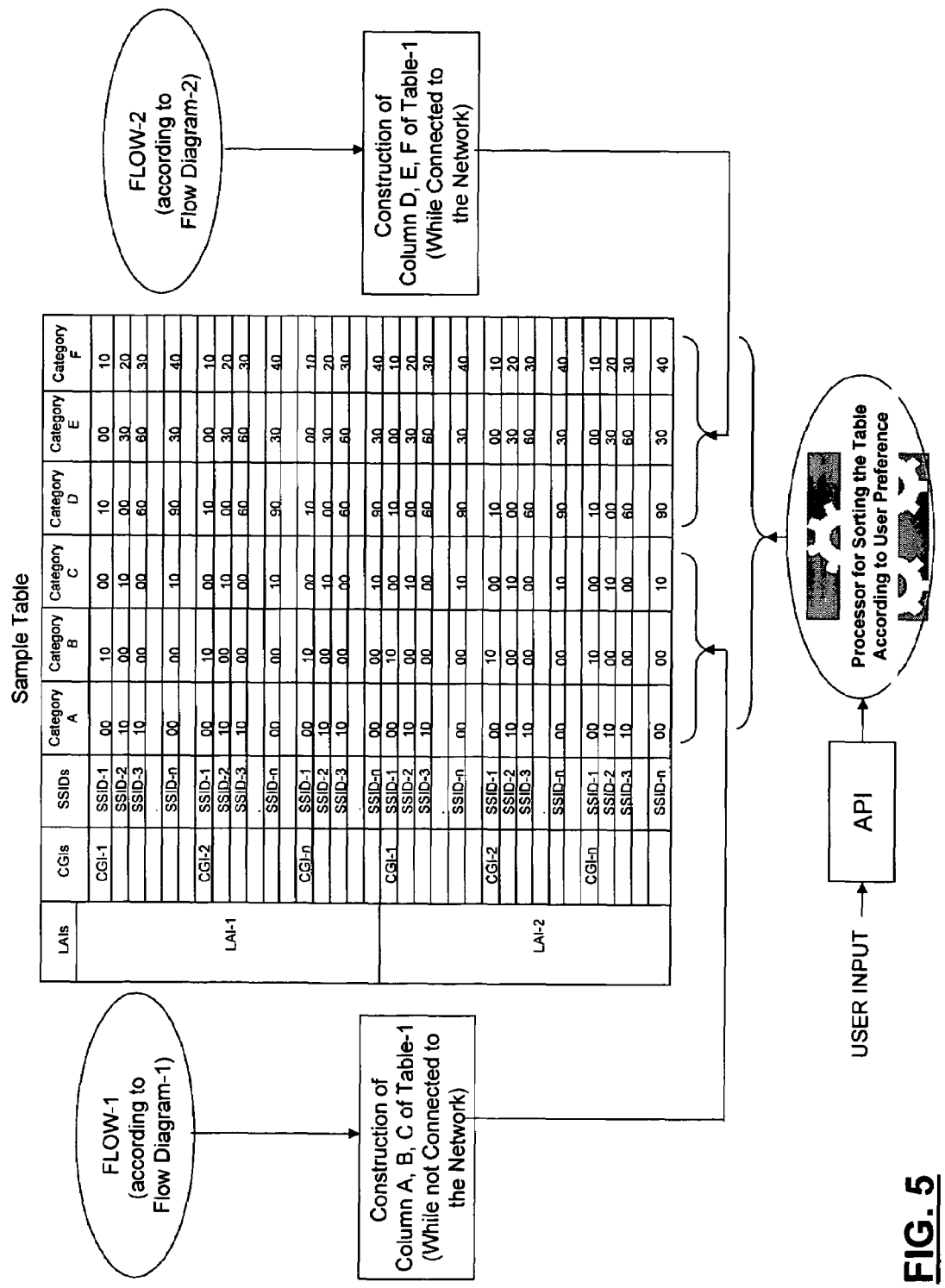
FIG. 5 is schematic diagram depicting an example of a table storing, e.g., mapped network parameters and some processes used to construct the table.

Referring to FIG. 3, it can, thus, be seen that this figure demonstrates illustrative functionality that can be implemented by the mobile device (note: all functionality of the mobile device may be implemented in software, hardware, firmware and/or the like as appropriate or desired under the circumstances) in the retrieving of parameters, e.g., for populating a table or the like as shown in FIG. 5 without requiring a connection to any network.

As shown, at a step 310, the system starts with a check for an active session. As step 320 a determination is made if a session is on. If the answer is yes, at step 325, the process gets both LAI and an updated CGI from (U)SIM by sending a dummy SMS to itself, and then listens to SSIDs and picks one in step 340. If the answer is no, at step 330, the process gets the LAI from the (U)SIM, and then listens to SSIDs and picks one in step 340. Then, at step 350 a determination is made if the SSID belongs to format type-1. If the answer is no, then the MS sends a probe and gets the SSID at step 355. Then, from either step 350 or 355 upon acquiring the SSID, a decision is made at 360 if such is already in the database. If the answer is yes, the system returns to step 340 to again listen to SSIDs and pick one. Otherwise, if the answer is no, the process proceeds to step 370, at which point a decision is made, in some preferred embodiments, as to whether the SSID belongs to the Home PLMN. If the answer is yes, then the process goes to step 375 and stores the SSID and retrieves parameters in Category A of Table-1 shown in FIG. 5 after mapping with LAI and CGI. Otherwise, if the answer is no, then the process proceeds to step 380, at which point a decision is made, in some preferred embodiments, as to whether the SSID belongs to the Home PLMN's roaming partners. If the answer is yes, then the process goes to step 385 and stores the SSID and retrieves parameters in Category B of Table-1 shown in FIG. 5 after mapping with LAI and CGI. Otherwise, if the answer is no, then the process proceeds to step 386 and stores the SSID and retrieves parameters in Category C of Table-1 shown in FIG. 5 after mapping with LAI and CGI. At which point, an evaluation of the battery power remaining is made at step 390. If there is less than a threshold level (such as, e.g., 75% in the example), then the process proceeds to confirm by step 400 if the user's preference criteria may have changed, and, if so, a trigger is sent to the sorting unit at step 410, and, if not, the process proceeds to stop. On the other hand, if the battery power is above the threshold (e.g., over 75%), then the system proceeds back to step 310.

Although FIG. 2 and FIG. 3 show a network environment, generalized for WLAN and cellular networks, other types of networks and other interworking can also be employed in other embodiments. For example, in addition to common cellular networks such as, e.g., those used in mobile telephone usage that provide connectivity, e.g., to Public Switched Telephone Networks (PSTN), the networks providing location information can include in some embodiments any appropriate network having cell areas (i.e., geographical areas). In addition, in other embodiments, other network selection criteria based on, for example, Pricing, Performance, and Security, may also be used.

As discussed above, the network information collected over time is preferably stored in any appropriate format. An example of a table or list populated with data is shown in FIG. 5. Preferably, the table stores network parameters mapped with LAI and CGI. Preferably, the columns are constructed based on predetermined criterion. By way of example, for illustrative purposes, a column designated as "Category A" evaluates and prioritizes the available WLANs in a given CGI based on "WLAN-PLMN interworking" criterion. On the other hand, the column designated as "Category B" evaluates and prioritizes the available WLANs in a given CGI based on "WLAN-PLMN Direct Roaming Agreement" criterion. In addition, the column titled "Category C" evaluates and prioritizes the available WLANs in a given CGI based on "WLAN-PLMN Indirect Roaming Agreement" criterion. In some preferred embodiments, these columns are filled in according to an algorithm illustrated in Flow Diagram 1 shown in FIG. 3.

Additionally, the information about performance parameters can be collected, and a log of network behavior and performance when a MS fully connects to the network, can be generated. With reference to the flow diagram shown in FIG. 4, this figure explains, e.g., an algorithm for getting information on these parameters and populating columns designated as D, E, and F of the sample Table shown in FIG. 5. Columns designated as "Category D," "Category E," and "Category F" evaluate and prioritize the available WLANs in a given CGI based on "Security", "Performance," and "Cost" criteria, respectively.

This gives the mobile an opportunity to gradually learn about the performance of various networks and helps a user to prioritize the network based on the information collected.

Figure 4:
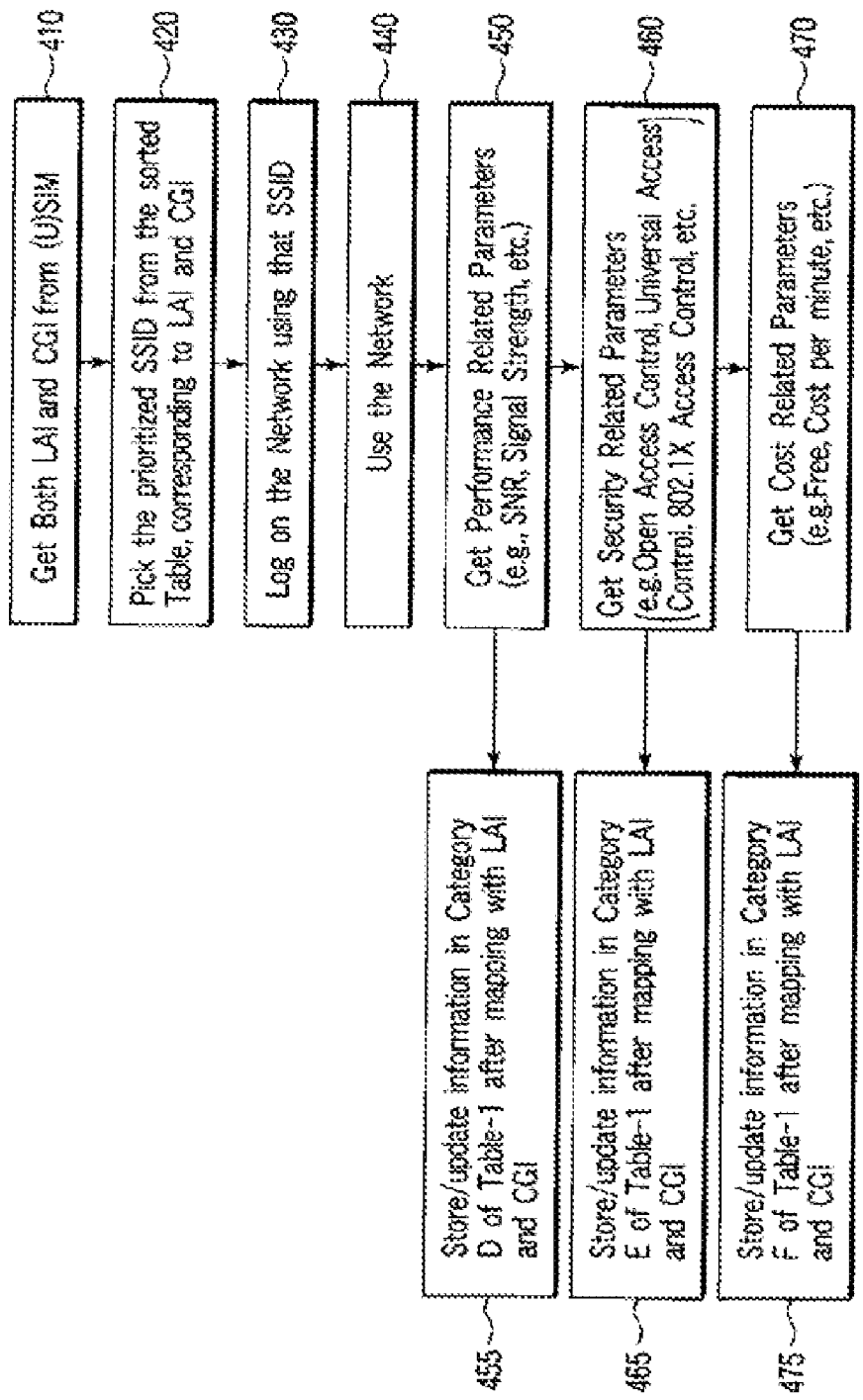
FIG. 4 is a flow diagram of the method of populating a table while connected to a network.

With reference to FIG. 4, functionality that can be employed by the mobile device is depicted, which can be used to, e.g., populate the Table-1 shown in FIG. 5 when the mobile station is connected to a network. First, at step 410, the process can get both the LAI and the CGI from the (U)SIM card. Then, at step 420, the process can pick the prioritized SSID from a sorted Table or the like (such as, e.g., shown in FIG. 5), then the mobile device can log into the network using that SSID as shown at step 430. Then, as shown at step 440, the mobile device can use the network. Then, based on such usage, additional information can be obtained. For example, as shown at step 450, the system can preferably obtain performance related parameters (such as, e.g., Signal to Noise Ration (SNR), Signal Strength, etc.), and, then, the process can go to step 455 to store and update information in Category D of Table 1 after mapping with LAI and CGI. As another example, as shown at step 460, the system can preferably obtain security related parameters (such as, e.g., Open Access Control, Universal Access Control, 802.1X Access Control, etc.), and, then, the process can go to step 465 to store and update information in Category E of Table 1 after mapping with LAI and CGI. As yet another example, as shown at step 470, the system can preferably obtain cost related parameters (such as, e.g., Free, Cost Per Minute, etc.), and, then, the process can go to step 475 to store and update information in Category F of Table 1 after mapping with LAI and CGI.

In an embodiment of the invention, a sorting mechanism that can sort the columns of the sample table based on user's preferred selection criteria can be employed. For example, if a user prefers to always connect to the most secure network, the sorting mechanism can prioritize the available networks by sorting column D and picking the SSID that has a greater weight in Column D, disregarding other columns.

In some embodiments, the SSID selection can be based on a single selection parameter (e.g., Security only), a double selection of parameters (e.g., Security and interworking), or on more selection parameters (e.g., Security, Performance and interworking). Thus, the columns of the sample table can be sorted based on simple (one selection parameter) or complex (combination of several parameters) methods. In some embodiments, user preferences can be input by a user through a User Interface (e.g., user entry via a graphical user interface, keyboard or the like) or an Application Interface (API) (e.g., computer entry via a software application or the like). They can also be preconfigured by the operator into the terminal or the USIM or the like.

Regardless of which selection criteria a user adopts, the mobile device is preferably be able to use the learned information to perform the following processing before it needs to handoff from one network to another, as for example a) cellular to WLAN, or b) one WLAN to another: a) detect the available networks; and b) perform authentication procedures.

In some preferred embodiments, the MS can look at its current LAI/CGI, use it as the index to look up a table, such as shown in FIG. 5, to quickly select one preferred candidate network from the list of networks stored in the table (priority-wise and mapped with LAI and CGI), and attach to the selected network promptly.

In some examples, a MS may know more about some WLANs than other WLANs at any given time. For example, the MS may have learned about a WLAN X from only the radio beacons received from the WLAN X, but may have never used the WLAN X and hence not have any upper layer information on, and experience with, the WLAN X. On the other hand, after using a WLAN Y, the MS can learn more about WLAN Y than WLAN X. However, the WLAN X may be a much better choice for the user in some examples.

Accordingly, in some embodiments, in order to ensure that the MS will give WLAN X a chance, a process of change governed by probabilities can be employed. In the preferred embodiments, a weight is assigned to each known WLAN. Preferably, the weight assigned to a WLAN reflects the "goodness" of the WLAN for satisfying the user's requirements and preferences, based on the information the MS collected about the WLAN so far. The better the WLAN, the higher the weight assigned. Every time, the MS acquires new information about a WLAN, it uses the new information to adjust the weight assigned to the WLAN. For example, if the MS just used the WLAN and found out that the quality of services (QoS) over the WLAN dropped significantly compared with the QoS when the MS used the WLAN last time, then the MS will reduce the weight assigned to the WLAN.

In some embodiments, the selection algorithm can make selection decisions based on the weights assigned to the known WLANs that the MS may move into next. For example, where $W_i$ is the weight assigned to WLAN i and there are k WLANs surrounding the MS at this moment, then, the MS can select the $j^{th}$ WLAN from these k WLANs with probability $p_j$ which is calculated as follows:

$$p_j = \frac{W_j}{\sum_{i=1}^{k} W_i}$$

where W=assigned weight value, $P_j$=probability, k=number of WLANS within said mobile station's current cell area, $W_i$=the weight assigned to WLAN i, and $W_j$=the weight assigned to WLAN j. In other embodiments, a variety of other methodologies may be employed.

Referring again to FIG. 5, the figure demonstrates overall functionality that may be implemented within the mobile station according to some preferred embodiments of the invention. In this regard, FIG. 5 illustrates that data or information can be stored within the mobile station (such as, e.g., within a database, digital data storage or the like) which can be depicted, for illustrative purposes, in the form of a Table as shown in some illustrative examples, which data can include SSID information mapped to (e.g., corresponded or correlated to) location information (e.g., LAI and/or CGI information as shown). In addition, as shown, the data can include a variety of Categories of data, some of which data may be available for some and not other networks at any given time (as discussed above). In addition, the data can include data obtained, in the preferred embodiments, from one of two (preferably both) processes—i.e., a process of obtaining information without connection to a network (such as, e.g., shown in FIG. 3 in which the mobile device listens to broadcasts of SSIDs or the like), and a process of obtaining information during connection to a network (such as, e.g., shown in FIG. 4 in which the mobile device actually picks a network and attaches to it and obtains additional information based on use of that network.

Last, FIG. 5 also depicts a user input (which can be via a keyboard, user interface or the like) or which can be via an API as shown in FIG. 5 which input is used by a processor for sorting the table according to user preference as schematically indicated in FIG. 5. As a result, the methodologies for selection can be varied based on user preferences in some preferred embodiments of the invention.

While a number of illustrative examples have been described above, it should be appreciated based on this disclosure that these are merely illustrative embodiments as explained below.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of a mobile station autonomous discovery of target networks and data regarding the target networks within a heterogeneous network having wireless cell areas, comprising the steps of:

after entering into a cell area, acquiring data from at least one target network;

mapping said data in relation to location data related to the cell area of a heterogeneous network, which location data is obtained when the mobile station is not in an active mode of communication with said heterogeneous network;

storing said mapped data for retention even after leaving the cell area; and wherein said mobile station performs said autonomous discovery of said target networks based on said stored mapped data without assistance from other mobile stations or information servers.

2. The method of claim 1, further including the step of using data from said list to determine where target networks are when said mobile station re-enters said cell area.

3. The method of claim 1, further including said cell area having a plurality of wireless local area networks and said list being populated with data from said plurality of wireless local area networks, and further including having said mobile station send a dummy message that causes said heterogeneous network to transmit location data while said mobile station is in an inactive mode with said heterogeneous network.

4. The method of claim 3, further including providing said mobile station with multiple radio network interfaces with respective radio interfaces configured to access different ones of said heterogeneous networks, said interfaces including a wireless local area network interface, and including the step of selecting the most suitable wireless local area network from said list of a plurality of wireless local area networks.

5. The method of claim 1, further including the step of performing pre-authentication with the target network.

6. The method of claim 1, further including the step of obtaining a local IP address from a target network upon entering into said cell area.

7. The method of claim 1, further including using said data acquired by autonomous discovery to support proactive handover actions, and including selecting the most suitable wireless local area network from said list of acquired target networks.

8. The method of claim 1, further including having a plurality of wireless local area networks inside said cell area and said list of known networks mapped with location data received from said network having wireless cell areas.

9. The method of claim 1, further including the steps of entering into a subsequent cell area, acquiring data from at least one a target network within said subsequent cell area, maintaining a list of acquired target networks within said subsequent cell area, and retaining said list upon exiting said subsequent cell area, whereby said list includes data from a plurality of cell areas.

10. The method of claim 9, wherein said mobile station performs proactive handover actions with a selected candidate network, including the steps of anticipating the need for a handover, selecting the most suitable network from said list of acquired target networks, based on predetermined criteria using available data from said list, and thereafter handing over to said selected candidate network on a as needed basis.

11. The method of claim 1, further including monitoring wireless local network broadcasts and storing parameters mapped with local area identity and/or cell global identity in said list.

12. The method of claim 1, further including having said data that is acquired include signal strength and time of acquisition.

13. The method of claim 1, further including the steps of:
a) recording a recent history of movements of said mobile station;
b) recording the wireless local area networks traversed in the movement pattern from a first cell area to subsequent cell areas;
c) storing data about recorded wireless local area networks specifically mapped with local area identity and/or cell global identity;
d) down selecting the most suitable candidate network;
e) acquiring a local IP address from said down selected most suitable candidate network;
f) performing pre-authentication with said selected network;
g) making said selected network available for a prospective handover; and
h) recording a log of performance of networks used.

14. The method of claim 13, further including the steps of a user of said mobile station selecting priority parameters for the selection of a candidate network from the available candidate networks, and storing in said mobile station said user selected priority parameters.

15. The method of claim 14, further including the steps of sorting data in said list based on user's preferred selection criteria and assigning priority selection weights to sorted data such that preferred selection criteria data has greater selection weights than non-preferred selected criteria data.

16. The method of claim 15, further comprising the step of selecting a service of ID based on user selected priority parameters.

17. A method of a mobile station autonomously discovering the existence of target networks and data regarding the target networks in a heterogeneous network having wireless cell areas, comprising the steps of:

upon entering into a cell area of a heterogeneous network, acquiring data from a plurality of target networks;

storing a list of acquired target networks; wherein said mobile station is configured to store said data related to said target networks based on location data of said heterogeneous network when said mobile station is not in active communication with said heterogeneous network; and selecting a target network from a plurality of target networks within said cell area, including selecting a target wireless local area network based on weights assigned to wireless local area networks.

18. The method of claim 17, further including selecting a target wireless local area networks in accordance with probability $P_j$ which is calculated as follows:

$$p_j = \frac{W_j}{\sum_{i=1}^{k} W_i}$$

where W=assigned weight value, $P_j$=probability, k=number of WLANS within said mobile station's current cell area, $W_i$=the weight assigned to WLAN i, and $W_j$=the weight assigned to WLAN j.

* * * * *